United States Patent
Mullah et al.

(10) Patent No.: US 10,168,985 B2
(45) Date of Patent: Jan. 1, 2019

(54) DYNAMIC AUDIO CODEC ENUMERATION

(71) Applicant: Intel Corporation, Santa Clara, CA (US)

(72) Inventors: Abid A. Mullah, Folsom, CA (US); Rafal Zielinski, Gdansk (PL); Naveen S. G., Bangalore (IN); Ganesh Ram S. T., Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/976,453

(22) Filed: Dec. 21, 2015

(65) Prior Publication Data
US 2017/0177294 A1    Jun. 22, 2017

(51) Int. Cl.
*G06F 3/16* (2006.01)

(52) U.S. Cl.
CPC .............. *G06F 3/165* (2013.01); *G06F 3/162* (2013.01)

(58) Field of Classification Search
USPC .......................................................... 700/94
See application file for complete search history.

(56) References Cited

U.S. PATENT DOCUMENTS

| | | | |
|---|---|---|---|
| 6,480,908 B1 | 11/2002 | Pan et al. | |
| 7,908,628 B2* | 3/2011 | Swart | H04N 7/17318 725/112 |
| 8,028,040 B1* | 9/2011 | Hobbs | G06F 9/45558 370/389 |
| 8,032,353 B1* | 10/2011 | Baron | G06F 9/45558 703/24 |
| 8,161,392 B1* | 4/2012 | Hobbs | H04L 67/08 715/736 |
| 8,171,322 B2 | 5/2012 | Fiennes et al. | |
| 9,110,592 B2* | 8/2015 | Lee | G06F 9/5016 |
| 9,182,939 B1* | 11/2015 | Wyatt | G06F 13/102 |
| 2006/0041895 A1* | 2/2006 | Berreth | G06F 13/102 719/328 |
| 2009/0157936 A1* | 6/2009 | Goss | G06F 1/3203 710/264 |
| 2014/0068281 A1* | 3/2014 | Diamant | G06F 1/3268 713/300 |

FOREIGN PATENT DOCUMENTS

WO    2015073125    5/2015

OTHER PUBLICATIONS

International Search Report and Written Opinion for International Application No. PCT/US2016/062912, dated Mar. 6, 2017.
International Preliminary Report on Patentability for International Patent Application No. PCT/US16/62912, dated Jul. 5, 2018.

\* cited by examiner

*Primary Examiner* — Amal Zenati
(74) *Attorney, Agent, or Firm* — Green, Howard & Mughal LLP

(57) ABSTRACT

Techniques related to dynamic audio codec enumeration and dynamically providing communication between drivers are discussed. Such techniques may include providing back door communication between the drivers via mailbox registers in audio codec hardware.

22 Claims, 9 Drawing Sheets

DYNAMIC AUDIO CODEC ENUMERATION

BACKGROUND

Power management difficulties may occur among an audio controller, an audio codec, a graphic software driver, an audio software driver, and an operating system. For example, when an audio/video receiver is connected to a platform, the processing of audio sent to the digital ports (e.g., HDMI/DP) may occur through an integrated audio codec. The audio driver may control the codec programming and functionality based on the audio application launched in the operating system such that when an HDMI/DP audio endpoint is plugged (or the like), the graphics driver may set a presence detect event in the integrated codec which may wake up the audio driver.

Furthermore, based on receiver capabilities, the graphics driver and the audio driver program the integrated codec registers. Some registers (e.g., verbs) may be programmed by the audio driver. Such programming may be characterized as a codec enumeration process. For example, the audio application may load the memory with audio data and the audio driver may initiate the audio data transfer to the integrated codec through the audio controller.

In some contexts, display hardware logic may be distributed in multiple power wells and, during display low power states, some of the logic may be turned off. For example, audio codec hardware logic may be in the power well that turns off when HDMI/DP external ports are not used for display or there is another lower power state where the audio codec is not used for playback. In such cases, the audio codec register values are lost and the audio driver does not re-program the enumeration registers. In such examples, when the display comes back up from the low power state, the user loses the audio codec from the GUI and will not be able to playback audio. For example, enumeration may occur again only on hard reset.

Current techniques to address such problems may include keeping both the audio controller and the audio codec powered-on. Such techniques avoid losing register contents in the audio codec because the audio codec is not allowed to power off. ☐However, such techniques may be suboptimal with respect to power savings, which is undesirable.

It may be advantageous to provide low power modes without loss of the audio codec. It is with respect to these and other considerations that the present improvements are needed.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
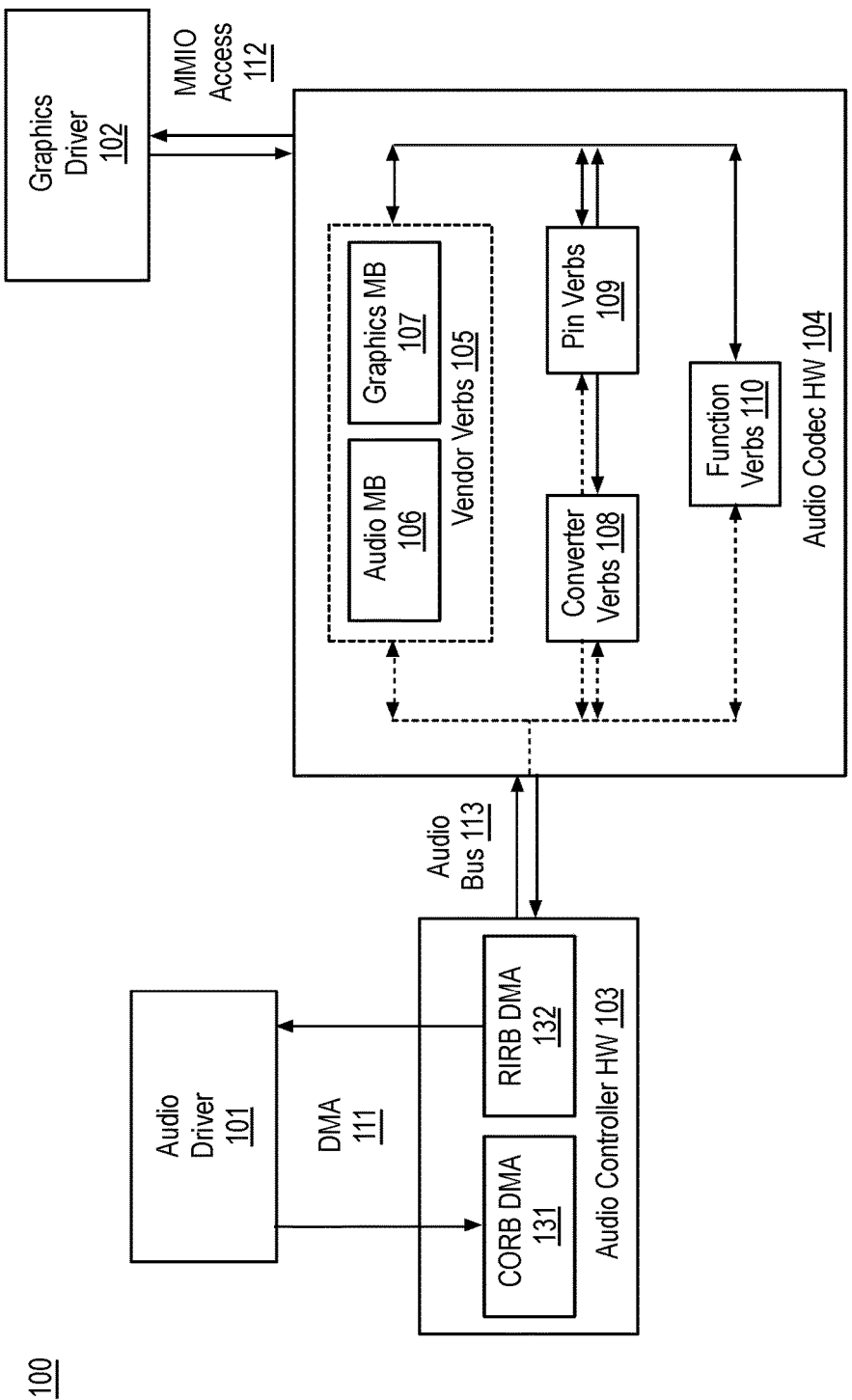
FIG. 1 illustrates an example device for dynamically providing communication between drivers.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation.

Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to dynamic enumeration of audio codec hardware and dynamically providing communication between drivers via audio codec hardware.

As discussed above, current techniques to address the loss of audio codec verbs that were provided during an initial enumeration of the audio codec may not provide power savings as such techniques include not allowing the audio codec to enter a lower power state (e.g., power off). The discussed techniques discussed herein may provide dynamic enumeration of audio codec hardware via a backdoor mechanism. For example, an audio codec hardware backdoor may be used to re-program lost registers by a graphics driver. In some embodiments, in the audio codec hardware, a path may be provided for the graphics driver to access the verb registers as memory mapped IO registers. The graphics driver may read the verb registers through this backdoor and save them before turning off a display power well (in which the audio codec hardware resides) in a low power mode. When the display power well is turned on again, the graphics driver may restore the verb registers through the backdoor before setting the audio hot plug event (or the like) to the audio driver. Using such techniques, the audio driver does not have to re-enumerate these registers and there is improved user experience with this dynamic enumeration by the graphics driver.

In an embodiment, in the context of save and restore of the audio codec registers as discussed, mail box registers in the vendor widget may be used without violating any existing audio specifications such as high definition (HD) audio specifications or the like. Such mailbox registers may be populated by the audio driver through verb programming (e.g., at initialization) and the registers may be accessed by the graphics driver through MMIO register access techniques. For example, such techniques may not violate existing specifications and may not require one driver to follow register access mechanisms of the other driver.

For example, techniques discussed herein may dynamically enumerate an audio codec without a user noticing the difference when the display enters/exits low power states. Such techniques may involve audio codec hardware, an audio driver, and a graphics driver. ☐In an embodiment, the following registers and interrupts may be provided in the audio codec hardware: three 32 bit registers to support an immediate command mode in the audio codec, audio and graphics mailbox registers in the vendor defined widget registers (such mailbox registers may provide for the communication between the audio driver and the graphics driver through the audio codec hardware as discussed herein), unsolicited tag and unsolicited enable in the vendor defined widget, and an interrupt register to the graphics driver.

Furthermore, the described techniques may be used in any context in which communication is desired between drivers via audio codec hardware. Such techniques may provide dynamic communication between the drivers and may include populating, by a driver, mailbox registers of the audio codec hardware with values such that the mailbox registers are at least write accessible by the driver and only read accessible by another driver, providing, from the audio codec hardware, an interrupt to the other driver based on the populating of the mailbox registers, providing, from the other driver and in response to the interrupt, a command to read the mailbox registers, and sending, by the audio codec hardware, the values from the mailbox registers to the other codec in response to the command. Such techniques may not violate existing specifications between and among the drivers and may allow each driver to utilize its own memory access techniques.

FIG. 1 illustrates an example device 100 for dynamically providing communication between drivers, arranged in accordance with at least some implementations of the present disclosure. As shown in FIG. 1, device 100 may include an audio driver 101, audio controller hardware (HW) 103, audio codec hardware 104, and a graphics driver 102. For example, audio driver 101 and graphics driver 102 may be implemented via a processor such as a central processor to control and provide a software interface to audio codec hardware 104 and/or audio controller hardware 103. For example, graphics driver 102 may be a graphics display driver or the like and graphics driver 102 may be coupled to audio codec hardware 104. Device 100 may be any suitable form factor device. For example, device 100 may be a computer, a laptop computer, an ultrabook, a tablet, a smart phone, a phablet, digital camera, a display device, a gaming device, a wearable device such as a smart watch, smart glasses, or the like. In an example, device 100 may provide communication between audio driver 101 and graphics driver 102 via mail box registers including audio mailbox (MB) registers 106 and graphics mailbox registers 107 of audio codec hardware 104.

As shown, in some embodiments, audio driver 101 may access audio codec hardware 104 via audio controller hardware 103. Audio driver 101 may be any suitable driver that provides a software interface to hardware components. For example, audio driver 101 may write to audio controller hardware 103 by direct memory access (DMA) 111 using direct memory access engines including, for example, command output ring buffer (CORB) direct memory access engine 131 and response input ring buffer (RIRB) direct memory access engine 132. As shown, direct memory access engine 131 may be used by audio driver 101 for write access and direct memory access engine 132 may be used for read access. Any commands or the like from audio driver 101 and/or data transfers for the like from audio codec hardware 104 may be passed from/to audio controller hardware 103 to/from audio codec hardware 104 via audio bus 113. Audio controller hardware 103 may be any suitable audio controller such as an HD audio controller or the like. Similarly, audio bus 113 may be any suitable audio bus such as an HD audio bus or the like. Although illustrated with an audio controller utilizing direct memory access, audio driver 101 may access audio codec hardware 104 using any suitable techniques or architecture.

Furthermore, as shown in hatched lines in audio codec hardware 104, audio driver 101 may access (e.g., via audio controller hardware 103 and audio bus 113), converter verbs 108, pin verbs 109, function verbs 110, and vendor verbs 105 including audio mailbox registers 106 and graphics mailbox registers 107. As used herein, the term verb represents any memory structure such as a memory register or the like. Graphics driver 102 may access audio codec hardware 104 by memory-mapped input/output (MMIO) access 112. Also, as shown in solid lines in audio codec hardware 104, graphics driver 102 may access, converter verbs 108, pin verbs 109, function verbs 110, and vendor verbs 105 including audio mailbox registers 106 and graphics mailbox registers 107.

As discussed, audio mailbox registers 106 and graphics mailbox registers 107 may be provided to facilitate communication (e.g., back door communication) between audio driver 101 and graphics driver 102. In an embodiment, audio mailbox registers 106 and graphics mailbox registers 107 may be implemented as vendor verbs 105. For example, such vendor verbs 105 may provide verbs or registers that are outside of existing specifications or baseline specifications or the like. Such vendor verbs 105 may therefore be used independently of such specifications and without requiring audio driver 101 and graphics driver 102 to modify there existing behaviors. Such vendor verbs 105 may be characterized as verbs, registers, mailbox registers, or the like. Audio mailbox registers 106 and graphics mailbox registers 107 may include any suitable memory registers of any suitable size such as 32 bit registers or the like. Audio codec hardware 104 may be any suitable audio codec such as an HD audio codec, an audio display codec, or the like.

Figure 2:
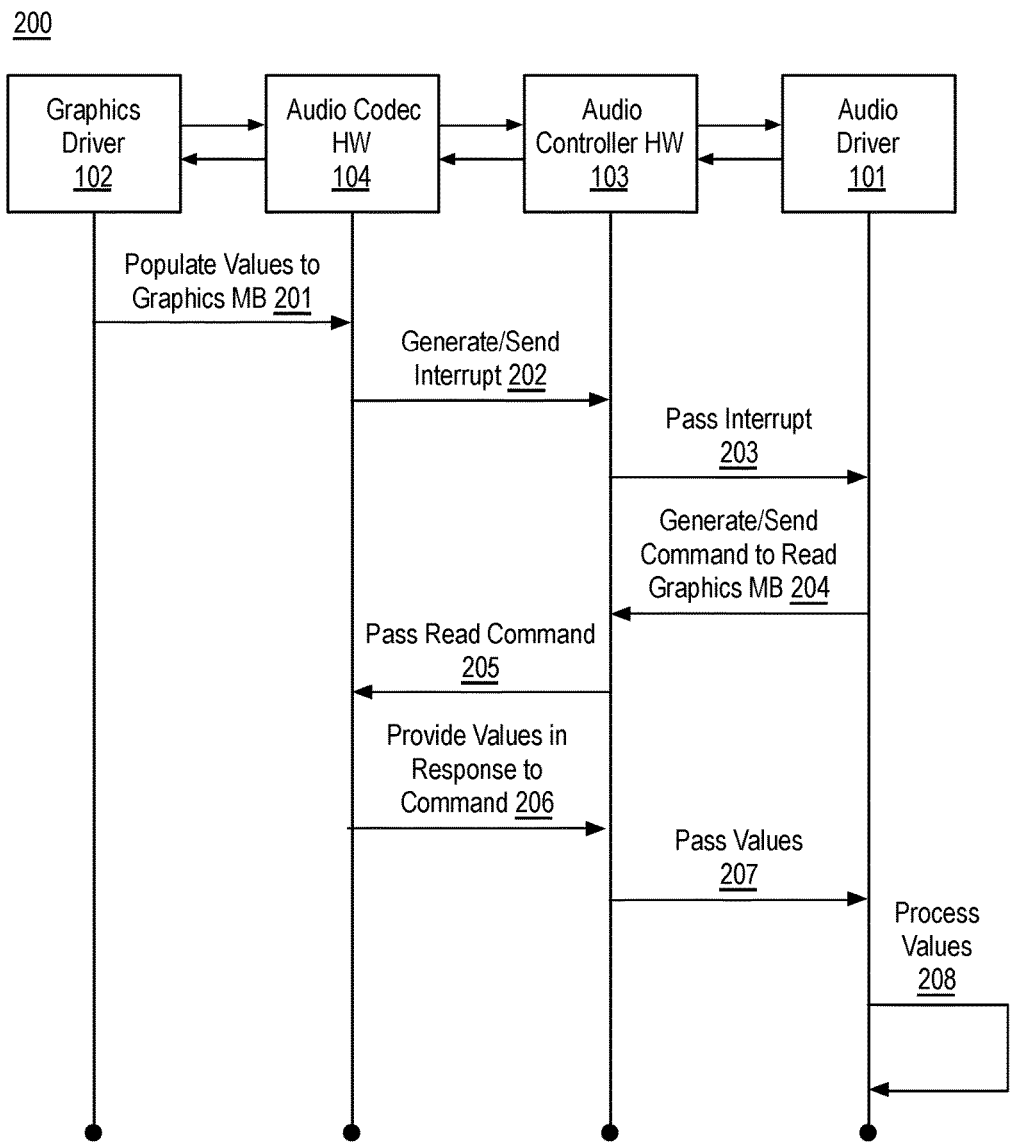
FIG. 2 is a parallel flow chart of an example process for dynamically providing communication between drivers.

FIG. 2 is a parallel flow chart of an example process 200 for dynamically providing communication between drivers, arranged in accordance with at least some implementations of the present disclosure. For example, process 200 may provide for a communication path that allows graphics driver 102 to communicate to audio driver 101 via audio codec hardware 104 and audio controller hardware 103.

As shown, process 200 may begin at operation 201, where graphics driver 102 may populate values to a graphics mailbox such as graphics mailbox registers 107 of audio codec hardware 104. Graphics driver 102 may populate the values using any suitable technique or techniques such as MMIO access 112 or the like. In an embodiment, graphics driver 102 writes to graphics mailbox registers 107 in audio codec hardware 104 through an immediate command mode of audio codec hardware 104. For example, such immediate command mode of audio codec hardware 104 may be provided by three 32 bit registers of audio codec hardware 104 that support immediate command (not shown). For example, graphics driver 102 may have at least write access to graphics mailbox registers 107. Furthermore, the values may be any suitable values that are to be communicated to audio driver 101. In some embodiments, the values may indicate a power down or low power state entry of audio codec hardware 104, a power up or power up entry or hot plug event or the like of audio codec hardware 104, or byte indexed values. Such embodiments are discussed further herein below.

As shown, processing may continue at operation 202, where audio codec hardware 104 may generate and send an interrupt such as an audio driver interrupt based on the population of graphics mailbox registers 107 of audio codec hardware 104. The interrupt generated by audio codec hardware 104 may include any suitable interrupt or signal or the like. For example, the interrupt may be characterized as an unsolicited response or interrupt as audio codec hardware 104 generates the interrupt based on the population of graphics mailbox registers 107 of audio codec hardware 104.

Processing may continue at operation 203, where the interrupt generated and sent at operation 202 may be passed by audio controller hardware 103 to audio driver 101. The interrupt may be passed by audio controller hardware 103 to audio driver 101 using any suitable technique or techniques. For example, the interrupt may be received by audio controller hardware 103 via audio bus 113 and transmitted to audio driver 101 via direct memory access engine 132.

Processing may continue at operation 204, where audio driver 101 may generate and send a command to read graphics mailbox registers 107 of audio codec hardware 104 based on the received interrupt. The command may include any suitable command that will command audio codec hardware 104 to provide the values stored in graphics mailbox registers 107 in response thereto. In an embodiment, the command is a verb or verbs requesting the contents of graphics mailbox registers 107. For example, the verb or verbs may be a request to read graphics mailbox registers 107. In an embodiment, audio driver 101 may have read only access to graphics mailbox registers 107.

Processing may continue at operation 205, where audio controller hardware 103 may pass the command generated and sent at operation 204 to audio codec hardware 104. The command may be passed by audio controller hardware 103 to audio codec hardware 104 using any suitable technique or techniques. For example, the command may be transmitted to audio controller hardware 103 via direct memory access engine 131 and to audio codec hardware 104 via audio bus 113.

Processing may continue at operation 206, where audio codec hardware 104 may provide the values of graphics mailbox registers 107 in response to the received command. For example the values previously populated to graphics mailbox registers 107 may be provided at operation 206. For example, the response including the values may be a solicited response to the verb (e.g., command) that provides the graphics mailbox registers 107 data to audio driver 101.

Processing may continue at operation 207, where the values provided at operation 206 may be passed by audio controller hardware 103 to audio driver 101. The values may be passed by audio controller hardware 103 to audio driver 101 using any suitable technique or techniques. For example, the values may be received by audio controller hardware 103 via audio bus 113 and transmitted to audio driver 101 via direct memory access engine 132.

Processing may continue at operation 208, where the values received by audio driver 101 may be processed by audio driver 101. Such processing may include any suitable processing. For example, in the context of receiving values indicating a low power state entry (e.g., power down) or the like of audio codec hardware 104, such processing may including identifying the low power state entry and ceasing communication with audio codec hardware 104. In the context of receiving values indicating a power up or a power up entry (e.g., an entry to a power up state), such processing may include identifying the power up entry and resuming communication with audio codec hardware 104. Furthermore, as is discussed further with respect to FIG. 4, in some embodiments, such communication from graphics driver 102 to audio driver 101 may be repeated to transmit blocks of data or data objects or the like that are larger than the memory size allocated to graphics mailbox registers 107. In such contexts, such processing may include identifying a byte index of the values that indexes other bytes of the values and storing the values. Upon receiving additional values, such processing may further identifying a byte index of the subsequently received values that indexes other bytes of the subsequently received values and combining the current values and previous values to form a block of data or data object or the like.

As discussed, process 200 may provide communication from graphics driver 102 to audio driver 101 via graphics mailbox registers 107 as implemented in audio codec hardware 104.

Figure 3:
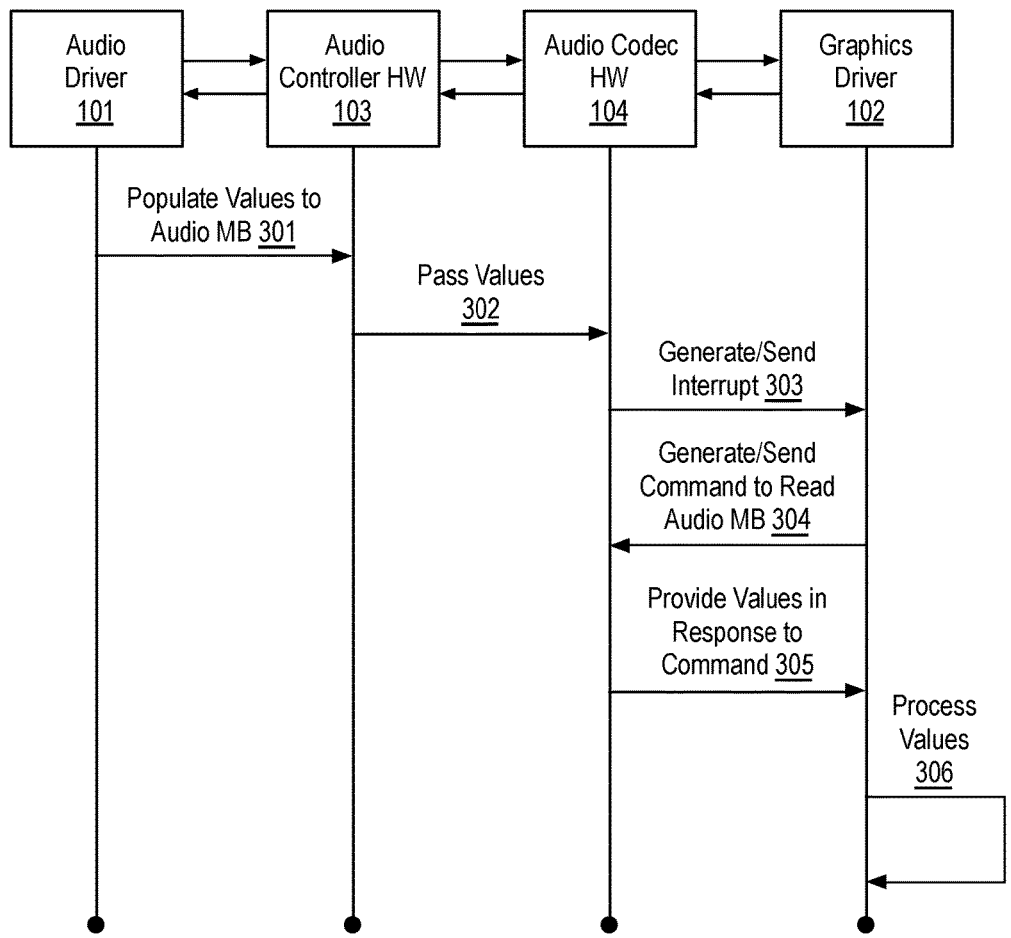
FIG. 3 is a parallel flow chart of another example process for dynamically providing communication between drivers.

FIG. 3 is a parallel flow chart of another example process 300 for dynamically providing communication between drivers, arranged in accordance with at least some implementations of the present disclosure. For example, process 300 may provide for a communication path that allows audio driver 101 to communicate to graphics driver 102 via audio codec hardware 104 and audio controller hardware 103.

As shown, process 300 may begin at operation 301, where audio driver 101 may populate values to an audio mailbox such as audio mailbox registers 106 of audio codec hardware 104. Furthermore, process 300 may include operation 302 where such values may be passed from audio controller hardware 103 to audio codec hardware 104. For example, audio driver 101 may populate the values using any suitable technique or techniques such as providing the values to audio controller hardware 103 via direct memory access engine 131 and audio controller hardware 103 providing the values to audio codec hardware 104 via audio bus 113 or the like. For example, audio driver 101 may have at least write access to audio mailbox registers 106. Furthermore, the values may be any suitable values that are to be communicated to graphics driver 102.

Processing may continue at operation 303, where audio codec hardware 104 may generate and send an interrupt such as a graphics driver interrupt based on the population of audio mailbox registers 106 of audio codec hardware 104. The interrupt generated by audio codec hardware 104 may include any suitable interrupt or signal or the like. For example, the interrupt may be characterized as an unsolicited response or interrupt as audio codec hardware 104 generates the interrupt based on the population of audio mailbox registers 106 of audio codec hardware 104.

Processing may continue at operation 304, where graphics driver 102 may generate and send a command to read audio mailbox registers 106 of audio codec hardware 104 based on the received interrupt. The command may include any suitable command that will command audio codec hardware 104 to provide the values stored in audio mailbox registers 106 in response to the command. In an embodiment, the command is a verb or verbs requesting the contents of graphics mailbox registers 107. In an embodiment, graphics driver 102 may have read only access to audio mailbox registers 106.

Processing may continue at operation 305, where audio codec hardware 104 may provide the values of audio mailbox registers 106 in response to the received command. For example the values previously populated to audio mailbox registers 106 may be provided at operation 305. For example, the response including the values may be a solicited response to the command that provides the audio mailbox registers 106 data to graphics driver 102.

Processing may continue at operation 306, where the values received by graphics driver 102 may be processed by graphics driver 102. Such processing may include any suitable processing. For example, as is discussed further with respect to FIG. 4, in some embodiments, such communication from audio driver 101 to graphics driver 102 may be repeated to transmit blocks of data or data objects or the like that are larger than the memory size allocated to audio mailbox registers 106. In such contexts, such processing may include identifying a byte index of the values that indexes other bytes of the values and storing the values. Upon receiving additional values, such processing may further identifying a byte index of the subsequently received values that indexes other bytes of the subsequently received values and combining the current values and previous values to form a block of data or data object or the like.

Figure 4:
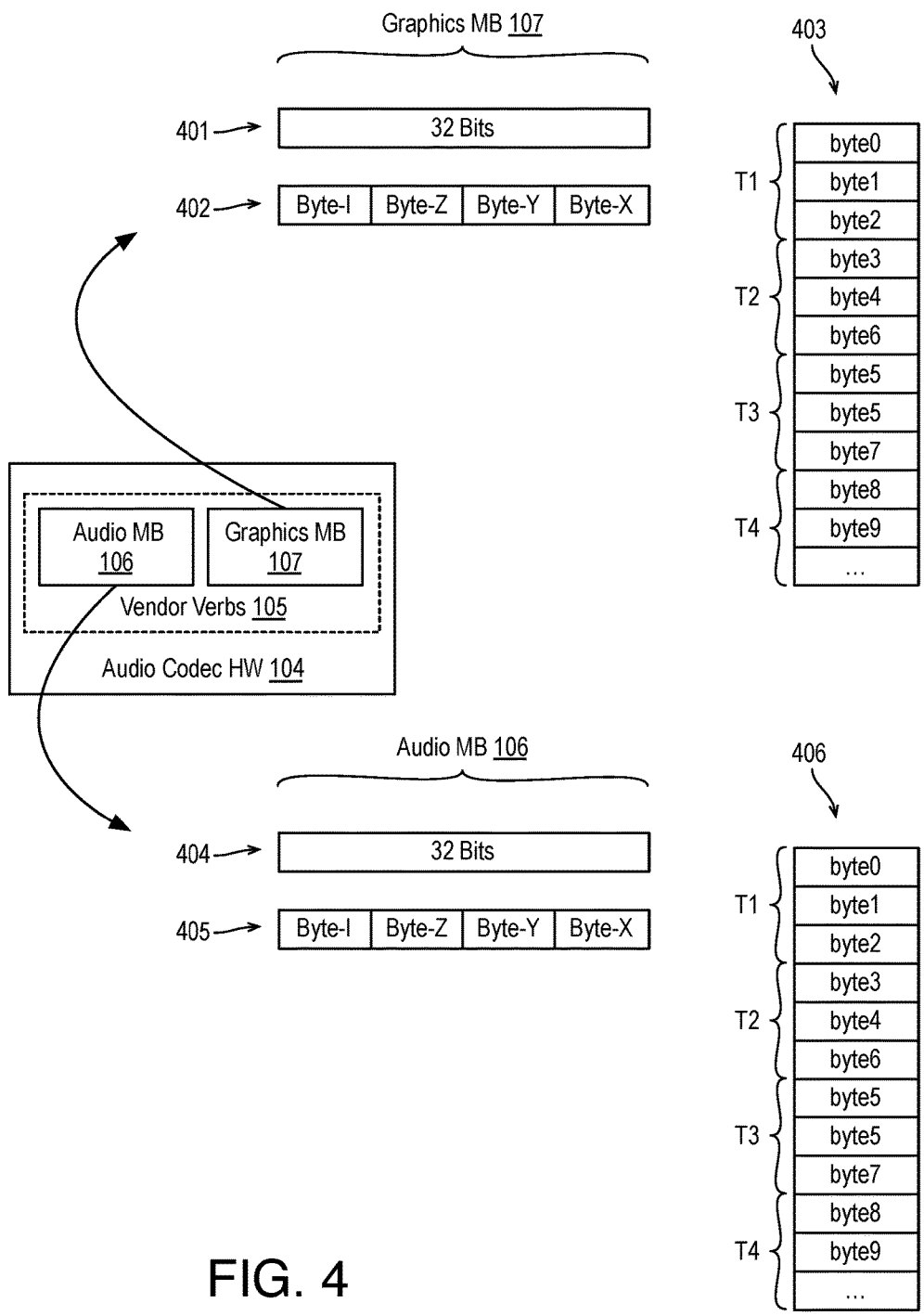
FIG. 4 illustrates example audio and graphics mailbox registers and example data objects.

FIG. 4 illustrates example audio and graphics mailbox registers 106, 107 and example data objects 403, 406, arranged in accordance with at least some implementations of the present disclosure. As discussed, audio mailbox registers 106 and graphics mailbox registers 107 may include or implement any suitable memory allocation or the like. As shown in FIG. 4, in an embodiment, graphics mailbox registers 107 may implement a 32 bit register 401. In such an embodiment, values transmitted from graphics driver 102 to audio driver 101 may have any suitable format that allows communication therebetween. In another embodiment, graphics mailbox registers 107 may implement a 32 bit register having a four byte data structure 402. Although discussed with respect to 32 bit registers, graphics mailbox registers 107 may have any suitable size such as 64 bits or the like. For example, graphics mailbox registers 107 may have any size and may or may not have a byte index. A data structure including a byte index as provided by data structure 402 may allow the transmission of a block of data or data object or the like such as data object 403.

For example, if data object 403 is larger than 32 bits, data object 403 may be partitioned into bytes of data (illustrated as byte0, byte, 1, byte9, . . . ), which may be transmitted in groupings (illustrated as transmissions T1, T2, T3, T4, . . . ). For example, in a first transmission, byte0, byte1, and byte2 of data object 403 may be stored to graphics mailbox registers 107 by graphics driver 102 as Byte-X, Byte-Y, and Byte-Z, respectively, and received by audio driver 101 as discussed herein. Furthermore, a byte index, Byte-I, may also be provided (e.g., transmitted from graphics driver 102 to audio driver 101) that indexes the other bytes of data structure 402 and/or indicating additional bytes are included in data object 403, additional bytes are yet to be transmitted, additional bytes were previously transmitted, or the like. For example, in a second transmission, byte3, byte4, and byte5 of data object 403 may be stored to graphics mailbox registers 107 by graphics driver 102 as Byte-X, Byte-Y, and Byte-Z, respectively, and received by audio driver 101. Furthermore a byte index may be provided for byte3, byte4, and byte5. Such processing may be repeated until data object 403 is transmitted and received. Furthermore, at the receiving driver, audio driver 101, such multiple bytes of data may be reassembled and processed.

Similarly, in an embodiment, audio mailbox registers 106 may implement a 32 bit register 404. In such an embodiment, values transmitted from audio driver 101 to graphics driver 102 may have any suitable format that allows communication therebetween. In another embodiment, audio mailbox registers 106 may implement a 32 bit register having a four byte data structure 405. Although discussed with respect to 32 bit registers, audio mailbox registers 106 may have any suitable size such as 64 bits or the like. For example, audio mailbox registers 106 may have any size and may or may not have a byte index. A data structure including a byte index such data structure 405 may allow the transmission of a block of data or data object or the like such as data object 406 from audio driver 101 to graphics driver 102.

Such processing, as shown, may include the storing to audio mailbox registers 106 of bytes if data object 406 as Byte-X, Byte-Y, and Byte-Z, respectively, and the inclusion of a byte index, Byte-I, that indexes the other bytes of data structure 405 and/or indicates additional bytes are included in data object 406, additional bytes are yet to be transmitted, additional bytes were previously transmitted, or the like. Transmission of data object 406 from audio driver 101 to graphics driver 102 may be provided in analogy to the transmission of data object 403 from graphics driver 102 to audio driver 101 for example.

As discussed herein with respect to FIGS. 2 and 3, communication between drivers may be provided via hardware audio codec. For example, process 200 provides communication from a graphics driver to an audio driver and process 300 provides communication from an audio driver to a graphics driver. In some embodiments, both such communication paths may be provided to establish two-way communication between the audio and graphics drivers. In other embodiments, only one of the two communication paths may be provided. Furthermore, such communication may be utilized to provide dynamic audio codec enumeration. For example, processes 200 and 300 may provide example audio and graphics mail box register access sequences and processes 200 and 300 may illustrate example audio hardware and drivers interaction.

Figure 5A:
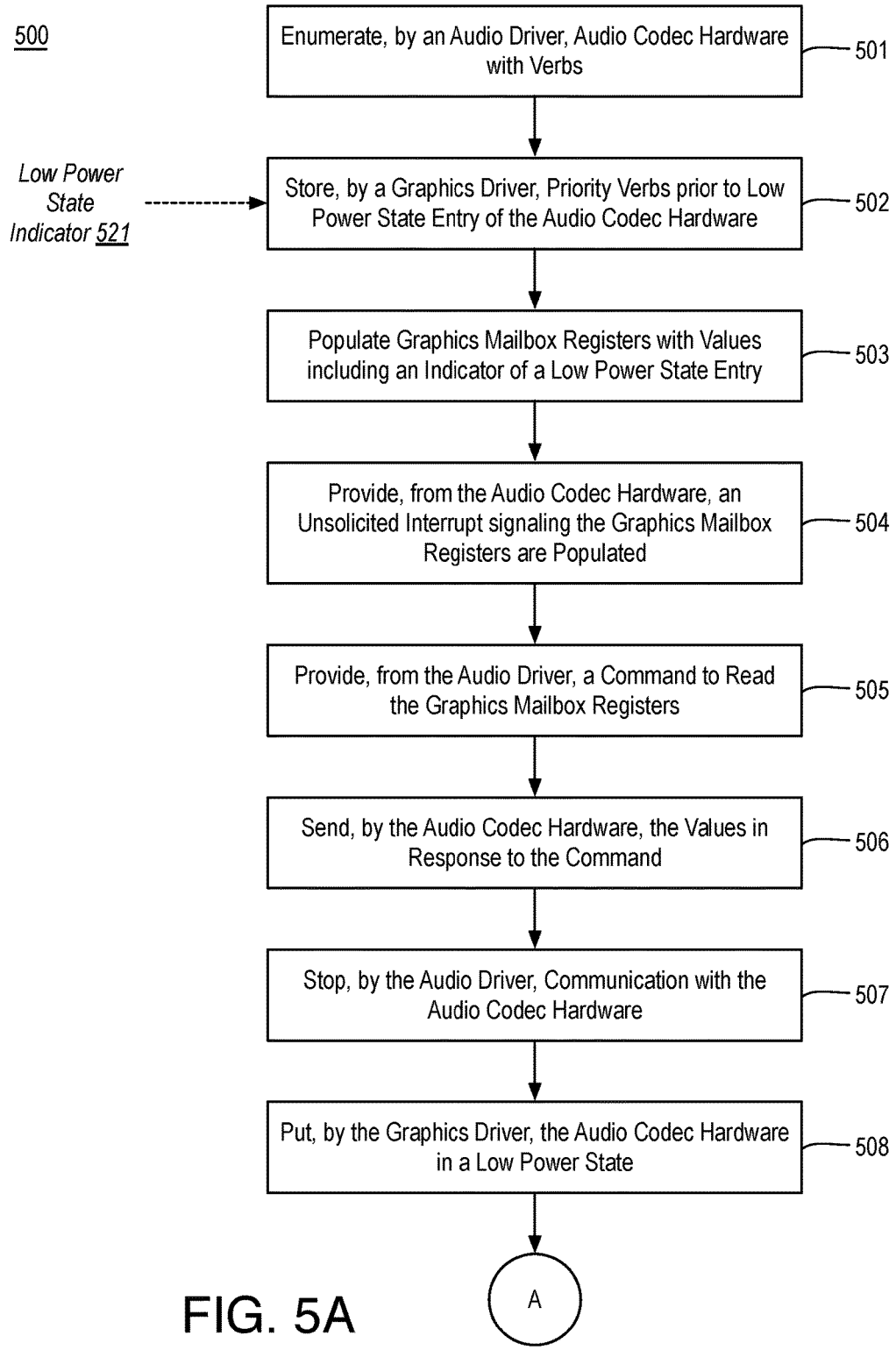
FIGS. 5A and 5B illustrate an example process for providing dynamic audio codec enumeration.
Figure 5B:
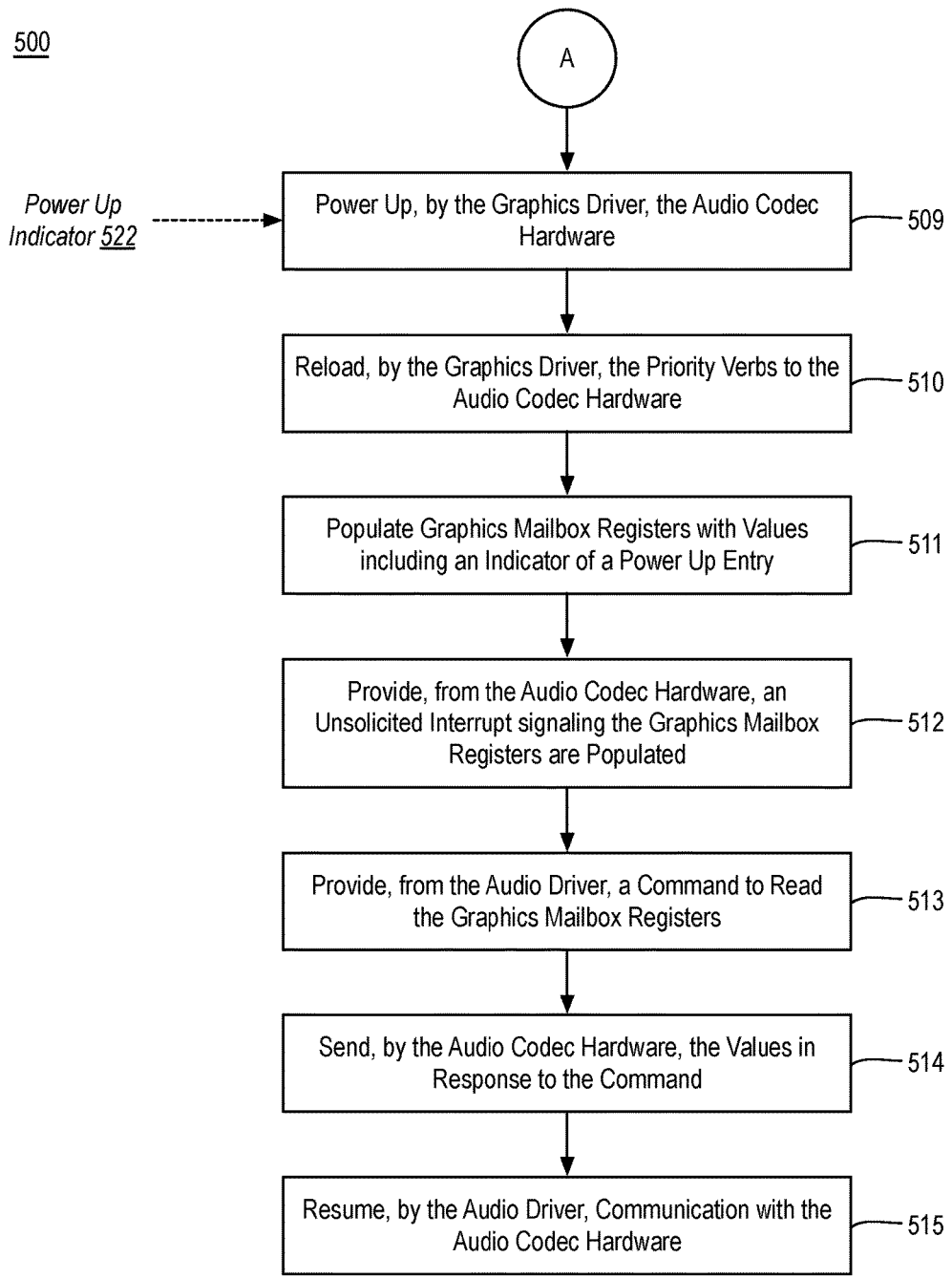

FIGS. 5A and 5B illustrate an example process 500 for providing dynamic audio codec enumeration, arranged in accordance with at least some implementations of the present disclosure. Process 500 may include one or more operations 501-515 as illustrated in FIGS. 5A and 5B. Process 500 or portions thereof may be performed by a device (e.g., device 100 or any other device or system discussed herein) to provide dynamic audio codec enumeration. Process 500 or portions thereof may be repeated for any number audio driver initializations, entries into low power states, entries into power up states, hot plug events, or the like. For example, operations 501-508 may provide a power down sequence for audio codec hardware and operations 509-515 may provide a power up sequence for the audio codec hardware.

As shown, process 500 may begin at operation 501, where an audio driver may enumerate audio codec hardware with verbs. In an embodiment, operation 501 may be performed at an initialization or boot. The audio driver may enumerate the audio codec hardware using any suitable technique or techniques. For example, the audio driver may send audio verbs through a direct memory access engine in an audio controller, which may transmit the verbs to the audio codec hardware via an audio bus. With reference to FIG. 1, audio driver 101 may enumerate audio codec hardware 104 with verbs via direct memory access 111 and direct memory access engine 131 of audio controller hardware 103, which may provide the verbs to audio codec hardware 104 via audio bus 113. In some embodiments, audio codec hardware 104 may be in a display power well controlled at least in part by graphics driver 102. For example, audio codec hardware 104 may be a portion of logic that is powered off when a display is powered down or put into a low power state, external ports (e.g., HDMI/DP external ports) are not in use, or the like.

Processing may continue at operation 502, where, in response to a low power state indicator 521, a graphics driver may store priority verbs prior to a low power entry of the audio codec hardware. Low power state indicator 521 may be any indicator or signal of an entry into a low power state or the like. For example, low power state indicator 521 may indicate the audio codec hardware is to enter a low power state or be powered down. Low power state indicator 521 may be received from another component or module such as a power manager or generated by a graphics driver or the like. The priority verbs may include any priority verbs enumerated by the audio driver at operation 501. For example, such priority verbs may be those needed to be re-loaded prior to establishing communication with the audio driver. The priority verbs may be stored to any suitable memory such as local memory or the like. In an embodiment, the graphics driver may read the codec verbs through MMIO access and save the contents to memory. For example, with reference to FIG. 1, graphics driver 102 may store priority verbs of converter verbs 108, pin verbs 109, function verbs 110, or other verbs of audio codec hardware 104 to a local memory (not shown) in response to a lower power state indicator prior to low power entry or power down of audio codec hardware 104.

Processing may continue at operation 503, where graphics mailbox registers may be populated by the graphics driver with values including an indicator or indicators of a lower power state entry of the audio codec hardware. For example, before low power entry, the graphics driver may populate the graphics mail box registers to indicate the low power entry. With reference to FIG. 1, graphics driver 102 may populate graphics mailbox registers 107 to indicate the low power entry (e.g., with values including an indicator or indicators of a lower power state entry) of audio codec hardware 104.

Processing may continue at operation 504, where the audio codec hardware may provide an interrupt such as an unsolicited audio driver interrupt to signal to the audio driver that the graphics mailbox registers are populated. As discussed with respect to process 200, in some embodiments, the interrupt may be sent by the audio codec hardware and passed along by audio controller hardware. With reference to FIG. 1, audio codec hardware 104 may generate an interrupt, which may be provided to audio controller hardware 103 via audio bus 113. Audio controller hardware 103 may pass the interrupt to audio driver 101 via direct memory access 111 by direct memory access engine 132.

Processing may continue at operation 505, where the audio driver may provide a command to read the contents or values of the graphics mailbox registers. The audio driver may generate the command using any suitable technique or techniques and the command may include any suitable content such as verbs or the like that requests the contents of the graphics mailbox registers. As discussed with respect to process 200, in some embodiments, the command may be sent by the audio driver to audio controller hardware, which may pass along the command to the audio codec hardware. With reference to FIG. 1, audio driver 101 may generate the command and provide it to audio controller hardware 103 via direct memory access 111 by direct memory access engine 131. Audio controller hardware 103 may pass the command to audio codec hardware 104 via audio bus 113.

Processing may continue at operation 506, where the audio codec hardware may send the values or contents in the graphics mailbox registers in response to the received command. As discussed with respect to process 200, in some embodiments, the values or contents may be sent by the audio codec hardware to audio controller hardware, which may pass along the values or contents to the audio driver. With reference to FIG. 1, audio codec hardware 104 may attain the values or content from graphics mailbox registers 107 and transmit the values or content to audio controller hardware 103 via audio bus 113. Audio controller hardware 103 may pass the values or content to audio driver 101 via direct memory access 111 by direct memory access engine 132.

Processing may continue at operation 507, where the audio driver may stop communication with the audio codec hardware in response to the values or content including the indicator or indicators of a lower power state entry of the audio codec hardware. For example, the audio driver may read the received values or content and translate the values or content into a command to stop commination with the audio codec hardware (e.g., as the audio codec hardware is about to be powered down). With reference to FIG. 1, audio driver 101 may stop communication with audio codec hardware 104 in response to the values or content including the indicator or indicators of a lower power state entry.

Processing may continue at operation 508, where the graphics driver may put the audio codec hardware in a low power state. The graphics driver may put the audio codec hardware in a low power state using any suitable technique or techniques such as via a command issued through MMIO access. With reference to FIG. 1, graphics driver 102 may put audio codec hardware 104 in a low power or off state.

Operations 502-508 may provide for context save for verbs (e.g., priority verbs) of audio codec hardware in response to a low power state indicator. Such operations may be provided in any suitable order so long as such verbs may be stored prior to the power down of the audio codec hardware. For example, as discussed, operations 502-508 may provide a power down sequence for audio codec hardware. Operations 509-515 provide for restoring such verbs during power up (e.g., in response to a power up or hot plug event or the like) and prior to the audio driver communicating with the audio codec hardware. For example, operations 509-515 may provide a power up sequence for audio codec hardware.

Turning to FIG. 5B, processing may continue at operation 509, where, in response to a power up indicator 522, the graphics driver may power up the audio codec hardware. Power up indicator 522 may be any indicator or signal of an entry into a power up or power on state or the like. For example, power up indicator 522 may indicate the audio codec hardware is to enter a power on state or the like. In some embodiments, power up indicator 522 may be a hot plug/unplug event. Power up indicator 522 may be received from another component or module such as a power manager or generated by a graphics driver or the like. With reference to FIG. 1, graphics driver 102 may power up audio codec hardware 104 in response to a power up indicator.

Processing may continue at operation 510, where the graphics driver may re-load or restore priority verbs to the audio codec hardware. The priority verbs may include the priority verbs stored at operation 502, for example. In an embodiment, the graphics driver may store the codec verbs through MMIO access. For example, with reference to FIG. 1, graphics driver 102 may re-load or restore priority verbs of converter verbs 108, pin verbs 109, function verbs 110, or other verbs of audio codec hardware 104.

Processing may continue at operation 511, where graphics mailbox registers may be populated by the graphics driver with values including an indicator or indicators of a power up entry or event for the audio codec hardware. For example, the graphics driver may populate the graphics mail box registers to indicate the power up entry or event. With reference to FIG. 1, graphics driver 102 may populate graphics mailbox registers 107 to indicate the power up entry or event (e.g., with values including an indicator or indicators of a power up entry or event) of audio codec hardware 104.

Processing may continue at operation 512, where the audio codec hardware may provide an interrupt such as an unsolicited audio driver interrupt to signal to the audio driver that the graphics mailbox registers are populated. In some embodiments, the interrupt may be sent by the audio codec hardware and passed along by audio controller hardware to the audio driver. With reference to FIG. 1, audio codec hardware 104 may generate an interrupt, which may be provided to audio controller hardware 103 via audio bus 113. Audio controller hardware 103 may pass the interrupt to audio driver 101 via direct memory access 111 by direct memory access engine 132.

Processing may continue at operation 513, where the audio driver may provide a command to read the contents or values of the graphics mailbox registers. The audio driver may generate the command using any suitable technique or techniques and the command may include any suitable content such as verbs or the like that requests the contents of the graphics mailbox registers. In some embodiments, the command may be sent by the audio driver to audio controller hardware, which may pass along the command to the audio codec hardware. With reference to FIG. 1, audio driver 101 may generate the command and provide it to audio controller hardware 103 via direct memory access 111 by direct memory access engine 131. Audio controller hardware 103 may pass the command to audio codec hardware 104 via audio bus 113.

Processing may continue at operation 514, where the audio codec hardware may send the values or contents in the graphics mailbox registers in response to the received command. As discussed with respect to process 200, in some embodiments, the values or contents may be sent by the audio codec hardware to audio controller hardware, which may pass along the values or contents to the audio driver. With reference to FIG. 1, audio codec hardware 104 may attain the values or content from graphics mailbox registers 107 and transmit the values or content to audio controller hardware 103 via audio bus 113. Audio controller hardware 103 may pass the values or content to audio driver 101 via direct memory access 111 by direct memory access engine 132.

Processing may continue at operation 515, where the audio driver may resume communication with the audio codec hardware in response to the values or content including the indicator or indicators of a power up entry or event for the audio codec hardware. For example, the audio driver may read the received values or content and translate the values or content into a command to resume commination with the audio codec hardware (e.g., as the audio codec hardware has been powered up). With reference to FIG. 1, audio driver 101 may resume communication with audio codec hardware 104 in response to the values or content including the indicator or indicators of a power up entry or event for the audio codec hardware.

Operations 509-515 may provide for context restore for saved verbs (e.g., priority verbs) of audio codec hardware in response to a power up entry or event indicator. Such operations may be provided in any suitable order so long as such verbs may be restored prior to the communication resuming between the audio driver and the audio codec hardware. In the example of process 500, indication of the audio codec hardware being transitioned to a power up state may be provided via graphics mailbox registers as discussed with respect to operations 511-514. In another embodiment, indication of the audio codec hardware being transitioned to a power up state may be provided by the graphics driver setting a presence detect of audio registers in the audio codec hardware. The audio codec hardware may then generate an unsolicited response to the audio driver to indicate the power up, hot plug/unplug event, or the like. In response, the audio driver may resume communication with the audio codec hardware as discussed with respect to operation 515.

For example, dynamic enumeration of an audio codec may be performed as follows. An audio driver may enumerate the audio codec on boot by sending the audio verbs through the CORB/RIRB DMA engine in the audio controller. Before low power entry, the graphics driver may populate the graphics mail box registers to indicate the lower power entry. Process 200 illustrates an sequence of the mail box communication between the audio and graphics drivers. The graphics driver may read the codec verbs through the MMIO accesses and save the contents (e.g., to local memory accessible by the graphics driver). The graphics driver may put the codec hardware in the low power state. On a hot plug/unplug event or the like, the graphics driver may bring the codec hardware out of the low power state, restore the codec verbs to re-enumerate the audio codec without audio driver involvement. Furthermore, the graphics driver may set a presence detect of audio registers. For example, setting a presence detect may set a bit to generate an unsolicited response to the audio driver to indicate the hot plug/unplug event and the audio driver may resume communication with the audio codec hardware.

Such techniques may avoid reprogramming (e.g., re-enumeration) of the codec registers by the audio driver in the low power entry/exit of the codec hardware. Furthermore, such techniques may offer the advantage of not violating an implemented audio specification, not requiring the audio driver to follow an MMIO access method, and not requiring the graphics driver to follow an implemented audio specification.

Figure 6:
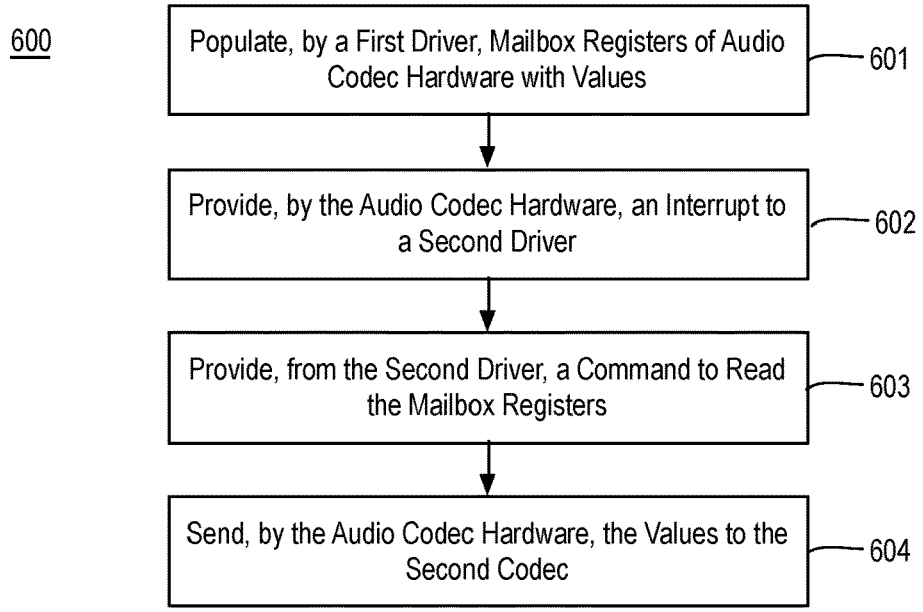
FIG. 6 is a flow diagram illustrating an example process for dynamically providing communication between drivers.

FIG. 6 is a flow diagram illustrating an example process 600 for dynamically providing communication between drivers, arranged in accordance with at least some implementations of the present disclosure. Process 600 may include one or more operations 601-604 as illustrated in FIG. 6. Process 600 may form at least part of a technique for providing dynamic communication between drivers. Process 600 may also form at least part of a technique for providing dynamic enumeration of an audio codec. By way of non-limiting example, process 600 may be performed by device 100 as discussed herein. Furthermore, process 600 will be described with reference to system 700 of FIG. 7.

Figure 7:
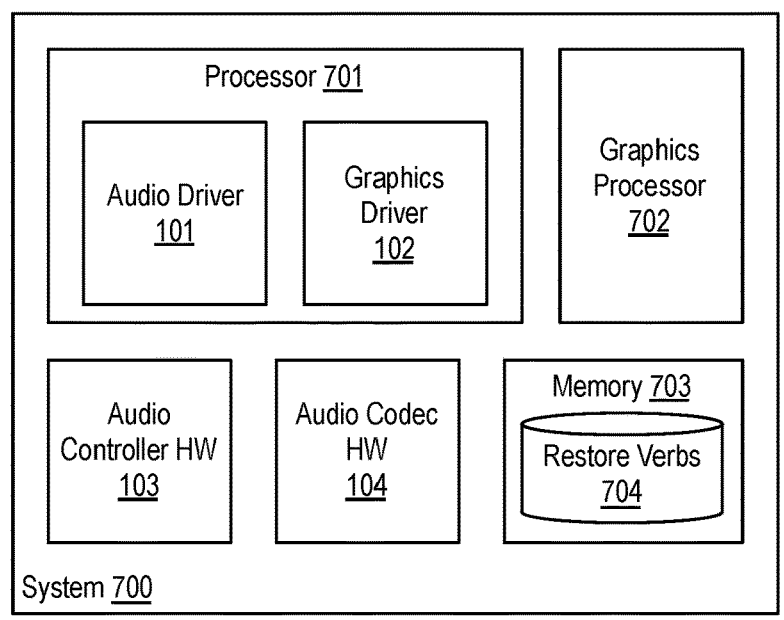
FIG. 7 is an illustrative diagram of an example system for dynamically providing communication between drivers.

FIG. 7 is an illustrative diagram of an example system 700 for dynamically providing communication between drivers, arranged in accordance with at least some implementations of the present disclosure. As shown in FIG. 7, system 700 may include a processor 701 such as a central processor, a graphics processor 702, a memory 703, audio controller hardware 103, and audio codec hardware 104. Also as shown, processor 701 may include or implement audio driver 101 and graphics driver 102. Furthermore, memory 703 may include or implement restore verbs 704, which may include priority verbs for context save and restore of audio codec hardware 104 as discussed herein. Such components or modules may be implemented to perform operations as discussed herein. In the example of system 700, memory 703 may include restore verbs 704 as discussed. Memory 703 may also store any data discussed herein.

Graphics processor 702 may include any number and type of graphics or image processing units. Processor 701 may include any number and type of processing units or modules that may provide control and other high level functions for system 700 and/or provide any operations as discussed herein such as those discussed with respect to audio driver 101 and graphics driver 102. Memory 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 703 may be implemented by cache memory.

Returning to discussion of FIG. 6, process 600 may begin at operation 601, where, by a first driver, mailbox registers of audio codec hardware may be populated with one or more values. For example, the mailbox registers may be at least write accessible by the first driver and only read accessible by a second driver. In an embodiment, the first driver is a graphics driver and the second driver is an audio driver. In an embodiment, populating the mailbox registers of the audio codec hardware comprises populating the mailbox registers in an immediate command mode by the first driver. For example, graphics driver 102 as implemented via processor 701 may populate graphics mailbox registers of audio codec hardware 104 and/or audio driver 101 as implemented via processor 701 may populate audio mailbox registers of audio codec hardware 104. In an embodiment, the mailbox registers may be 32 bit registers (e.g., without a byte index). In another embodiment, the mailbox registers may be 32 bit registers implementing 4 bytes with one byte index such that the one or more values include a byte index that indexes multiple other bytes of the one or more values. In such examples, process 600 may be repeated multiple times such that sets of received values may each represent portions of a data object or the like.

Processing may continue at operation 602, where, from the audio codec hardware, an interrupt may be provided to the second driver based on the populating of the mailbox registers. For example, the interrupt may be an unsolicited interrupt to the second driver. For example, audio codec hardware 104 may generate an audio driver interrupt in response to graphics mailbox registers being populated and/or a graphics driver interrupt in response to audio mailbox registers being populated.

Processing may continue at operation 603, where, from the second driver and in response to the interrupt, a command may be provided to read the mailbox registers. For example, in response to an audio driver interrupt, audio driver 101 as implemented via processor 701 may provide a command to read the populated graphics mailbox registers and/or, in response to a graphics driver interrupt, graphics driver 102 as implemented via processor 701 may provide a command to read the populated audio mailbox registers. In an embodiment, providing the command to read the mailbox registers may include providing the command to read the mailbox registers from the second driver and through a controller. For example, the command may be provided from audio driver 101 as implemented via processor 701 through audio controller hardware 103 to audio codec hardware 104.

Processing may continue at operation 604, where, by the audio codec hardware, the one or more values from the mailbox registers may be sent to the second driver in response to the command. For example, audio codec hardware 104 may provide values or contents from graphics mailbox registers of audio codec hardware 104 to audio driver 101 in response to a command from audio driver 101 and/or audio codec hardware 104 may provide values or contents from audio mailbox registers of audio codec hardware 104 to graphics driver 102 in response to a command from graphics driver 102.

In some examples, operations 601-604 may support dynamic enumeration of an audio codec. For example, the audio codec hardware may be within a display power well controlled at least in part by the graphics driver such that the audio codec hardware may be placed into a low power state or powered off in certain contexts. In such example, the first driver may be a graphics driver and the second driver may be an audio driver. In an embodiment, prior to operation 601, the audio driver may enumerate the audio codec hardware with multiple verbs. For example, audio driver 101 as implemented via processor 701 may enumerate audio codec hardware 104. Furthermore, the graphics driver may store priority verbs from the audio codec hardware to a local memory in response to a low power state entry or power down indicator or the like. For example, graphics driver 102 as implemented via processor 701 may store priority verbs (e.g., restore verbs 704) from audio codec hardware 104 to memory 703.

The graphics driver may then populate mailbox registers of the audio codec hardware with values (as discussed with respect to operation 601) indicating a low power state entry of the hardware codec. The audio codec hardware my provide an interrupt to the audio driver (as discussed with respect to operation 602), the audio driver may provide a command to read the graphics mailbox registers (as discussed with respect to operation 603), and the audio codec hardware may send the values from the graphics mailbox registers to the audio driver in response to the command (as discussed with respect to operation 604).

Subsequently, the audio driver may stop communication with the audio codec hardware based on the received values or contents and the graphics driver may put the audio codec hardware into the low power state or power off the audio codec hardware. For example, audio driver 101 as implemented via processor 701 may stop communication with audio codec hardware 104 and graphics driver 102 as implemented via processor 701 may put audio codec hardware 104 into the low power state.

Furthermore, in response to a power up or power on event or the like, by the graphics driver may re-load the priority verbs to the audio codec hardware. For example, graphics driver 102 as implemented via processor 701 may re-load the priority verbs to audio codec hardware 104. Similarly to operations 601-604, the graphics driver may transmit values including an indicator of the power up entry to the audio driver. For example, the graphics driver may populate the graphics mailbox registers of the audio codec hardware with values including an indicator of a power up entry, the audio codec hardware may provide an interrupt to the audio driver based on the populating of the graphics mailbox registers, the audio driver may, in response to the interrupt, provide a command to read the graphics mailbox registers, and the audio codec hardware may send the values from the graphics mailbox registers to the audio driver. In response to the values, the audio driver may resume communication with the hardware audio codec.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as scanners (e.g., to perform optical scanning to generate scanned input images), printers (e.g., to translate an output image to paper or similar physical media), image pre-processing circuitry, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions thereof, or any other module, component, or technique as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
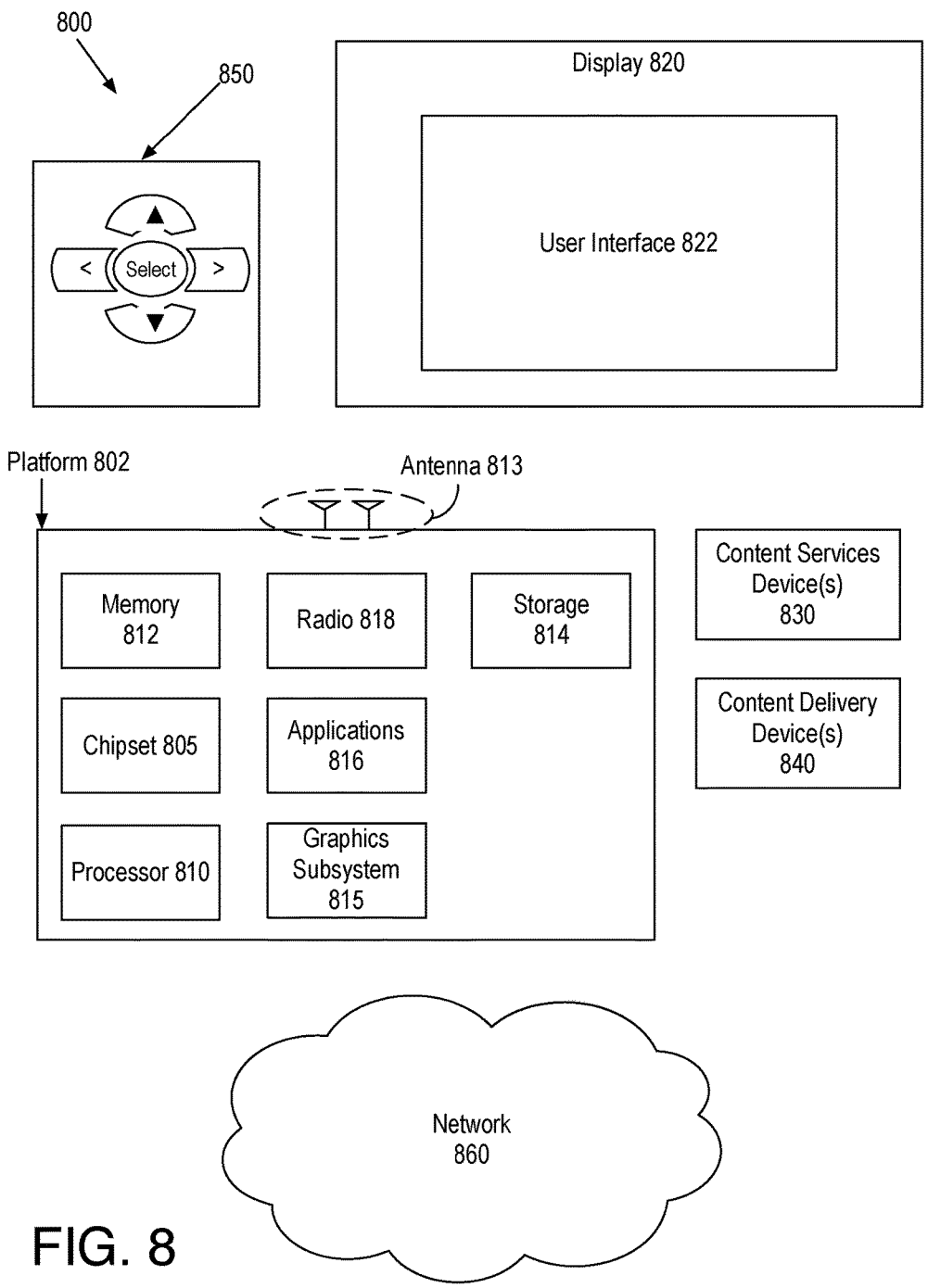
FIG. 8 is an illustrative diagram of an example system.

FIG. 8 is an illustrative diagram of an example system 800, arranged in accordance with at least some implementations of the present disclosure. In various implementations, system 800 may be a computing system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile internet device (MID), messaging device, data communication device, peripheral device, scanner, printer, multi-function device, and so forth.

In various implementations, system 800 includes a platform 802 coupled to a display 820. Platform 802 may receive content from a content device such as content services device(s) 830 or content delivery device(s) 840 or other content sources such as an image sensor 819. For example, platform 802 may receive raw image data from image sensor 819 or any other content source. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816, image signal processor 817 and/or radio 818. Chipset 805 may provide intercommunication among processor 810, memory 812, storage 814, graphics subsystem 815, applications 816, image signal processor 817 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Image signal processor 817 may be implemented as a specialized digital signal processor or the like used for image processing. In some examples, image signal processor 817 may be implemented based on a single instruction multiple data or multiple instruction multiple data architecture or the like. In some examples, image signal processor 817 may be characterized as a media processor. As discussed herein, image signal processor 817 may be implemented based on a system on a chip architecture and/or based on a multi-core architecture.

Graphics subsystem 815 may perform processing of images such as still or video for display. Graphics subsystem 815 may be a graphics processing unit (GPU), a visual processing unit (VPU), or an image processing unit, for example. In some examples, graphics subsystem 815 may perform scanned image rendering as discussed herein. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any flat panel monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of navigation controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, navigation controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
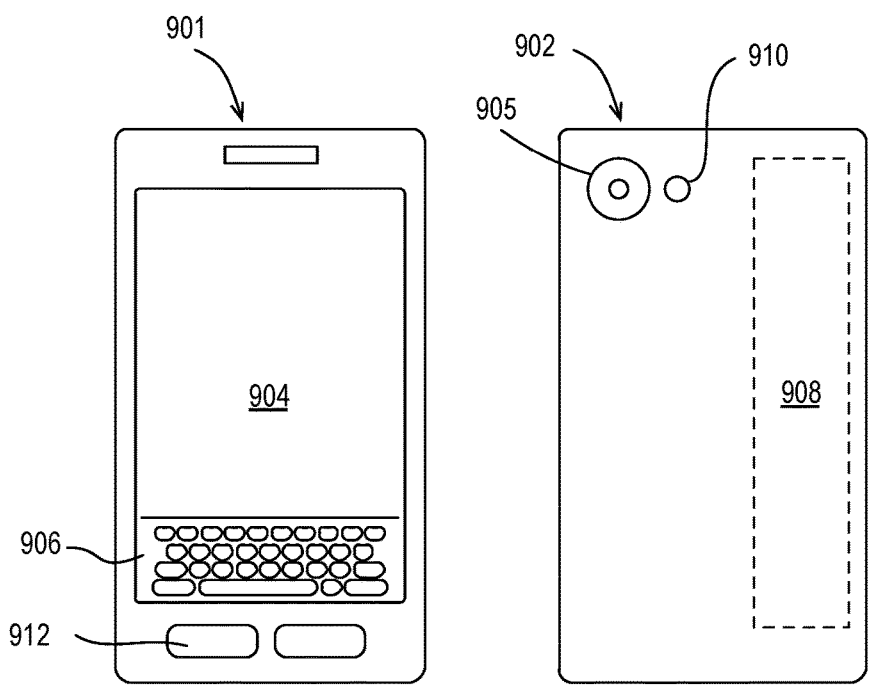
FIG. 9 illustrates an example small form factor device, all arranged in accordance with at least some implementations of the present disclosure.

As described above, system 800 may be embodied in varying physical styles or form factors. FIG. 9 illustrates an example small form factor device 900, arranged in accordance with at least some implementations of the present disclosure. In some examples, system 800 may be implemented via device 900. In other examples, any devices or techniques or portions thereof may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. As shown, device 900 may include a camera 905 (e.g., including a lens, aperture, and imaging sensor) and a flash 910 integrated into back 902 (or elsewhere) of device 900.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for dynamically providing communication between drivers comprises populating, by a first driver, mailbox registers of audio codec hardware with one or more values, providing, from the audio codec hardware, an interrupt to a second driver based on the populating of the mailbox registers, providing, from the second driver and in response to the interrupt, a command to read the mailbox registers, and sending, by the audio codec hardware, the one or more values from the mailbox registers to the second driver in response to the command.

Further to the first embodiments, the first driver is a graphics driver and the second driver is an audio driver.

Further to the first embodiments, the method further comprises storing, by the first driver and prior to populating the mailbox registers, one or more verbs from the audio codec hardware to a local memory, wherein the one or more values comprise an indicator of a low power state entry of the audio codec hardware and re-loading, by the first driver and in response to a power up event, the one or more verbs to the audio codec hardware.

Further to the first embodiments, the method further comprises storing, by the first driver and prior to populating the mailbox registers, one or more verbs from the audio codec hardware to a local memory, wherein the one or more values comprise an indicator of a low power state entry of the audio codec hardware re-loading, by the first driver and in response to a power up event, the one or more verbs to the audio codec hardware, and enumerating, by the second driver and prior to storing the one or more verbs, the audio codec hardware with at least the one or more verbs.

Further to the first embodiments, the method further comprises storing, by the first driver and prior to populating the mailbox registers, one or more verbs from the audio codec hardware to a local memory, wherein the one or more values comprise an indicator of a low power state entry of the audio codec hardware re-loading, by the first driver and in response to a power up event, the one or more verbs to the audio codec hardware, populating, by the first driver, the mailbox registers with one or more second values comprising an indicator of a power up entry, providing, from the audio codec hardware, a second interrupt to the second driver based on the populating of the mailbox registers with the one or more second values, providing, from the second driver and in response to the second interrupt, a second command to read the mailbox registers, and sending, by the audio codec hardware, the one or more second values from the mailbox registers to the second driver in response to the second command.

Further to the first embodiments, the method further comprises storing, by the first driver and prior to populating the mailbox registers, one or more verbs from the audio codec hardware to a local memory, wherein the one or more values comprise an indicator of a low power state entry of the audio codec hardware re-loading, by the first driver and in response to a power up event, the one or more verbs to the audio codec hardware, populating, by the first driver, the mailbox registers with one or more second values comprising an indicator of a power up entry, providing, from the audio codec hardware, a second interrupt to the second driver based on the populating of the mailbox registers with the one or more second values, providing, from the second driver and in response to the second interrupt, a second command to read the mailbox registers, sending, by the audio codec hardware, the one or more second values from the mailbox registers to the second driver in response to the second command, and resuming communication between the second driver and the audio codec hardware based on the one or more second values.

Further to the first embodiments, the one or more values comprise a byte index that indexes multiple other bytes of the one or more values and the method further comprises populating, by the first driver, the mailbox registers with one or more second values, wherein the one or more second values comprise a second byte index that indexes multiple other bytes of the one or more second values, and wherein the one or more values and one or more second values each represent portions of a data object.

Further to the first embodiments, providing the command to read the mailbox registers comprises providing the command to read the mailbox registers from the second driver and through a controller.

Further to the first embodiments, the audio codec hardware is within a display power well controlled at least in part by the first driver.

Further to the first embodiments, populating the mailbox registers of the audio codec hardware comprises populating the mailbox registers in an immediate command mode by the first driver.

In one or more second embodiments, a system to dynamically provide communication between drivers comprises audio codec hardware logic circuitry and a processor coupled to the audio codec hardware logic circuitry, wherein the processor is to populate, via a first driver, mailbox registers of the audio codec hardware with one or more values and to provide, via a second driver and in response to an interrupt, a command to read the mailbox registers, and wherein the audio codec hardware logic circuit is to provide the interrupt to the second driver based on the population of the mailbox registers and to send the one or more values from the mailbox registers to the second driver in response to the command.

Further to the second embodiments, the first driver is a graphics driver and the second driver is an audio driver.

Further to the second embodiments, the processor is further to store, via the first driver and prior to the population of the mailbox registers, one or more verbs from the audio codec hardware to a local memory, wherein the one or more values comprise an indicator of a low power state entry of the audio codec hardware and to re-load, via the first driver and in response to a power up event, the one or more verbs to the audio codec hardware.

Further to the second embodiments, the processor is further to store, via the first driver and prior to the population of the mailbox registers, one or more verbs from the audio codec hardware to a local memory, wherein the one or more values comprise an indicator of a low power state entry of the audio codec hardware, to re-load, via the first driver and in response to a power up event, the one or more verbs to the audio codec hardware, and to enumerate, via the second driver and prior to the store of the one or more verbs, the audio codec hardware with at least the one or more verbs.

Further to the second embodiments, the processor is further to store, via the first driver and prior to the population of the mailbox registers, one or more verbs from the audio codec hardware to a local memory, wherein the one or more values comprise an indicator of a low power state entry of the audio codec hardware, to re-load, via the first driver and in response to a power up event, the one or more verbs to the audio codec hardware, and to populate, via the first driver, the mailbox registers with one or more second values comprising an indicator of a power up entry and to provide, via the second driver and in response to a second interrupt, a second command to read the mailbox registers, and wherein the audio codec hardware logic circuitry is further to providing the second interrupt to the second driver based on the population of the mailbox registers with the one or more second values and to send the one or more second values from the mailbox registers to the second driver in response to the second command.

Further to the second embodiments, the processor is further to store, via the first driver and prior to the population of the mailbox registers, one or more verbs from the audio codec hardware to a local memory, wherein the one or more values comprise an indicator of a low power state entry of the audio codec hardware, to re-load, via the first driver and in response to a power up event, the one or more verbs to the audio codec hardware, to populate, via the first driver, the mailbox registers with one or more second values comprising an indicator of a power up entry and to provide, via the second driver and in response to a second interrupt, a second command to read the mailbox registers, and wherein the audio codec hardware logic circuitry is further to providing the second interrupt to the second driver based on the population of the mailbox registers with the one or more second values and to send the one or more second values from the mailbox registers to the second driver in response to the second command, and to resume communication between the second driver and the audio codec hardware based on the one or more second values.

Further to the second embodiments, the one or more values comprise a byte index that indexes multiple other bytes of the one or more values and the processor is further to populate, via the first driver, the mailbox registers with one or more second values, wherein the one or more second values comprise a second byte index that indexes multiple other bytes of the one or more second values, and wherein the one or more values and one or more second values each represent portions of a data object.

Further to the second embodiments, the processor to provide the command to read the mailbox registers comprises the processor to provide the command to read the mailbox registers from the second driver and through a controller.

Further to the second embodiments, the audio codec hardware is within a display power well controlled at least in part by the first driver.

Further to the second embodiments, the processor to populate the mailbox registers of the audio codec hardware comprises the processor to populate the mailbox registers in an immediate command mode by the first driver.

In one or more third embodiments, a system comprises means for populating, by a first driver, mailbox registers of audio codec hardware with one or more values, means for providing, from the audio codec hardware, an interrupt to a second driver based on the populating of the mailbox registers, means for providing, from the second driver and in response to the interrupt, a command to read the mailbox registers, and means for sending, by the audio codec hardware, the one or more values from the mailbox registers to the second driver in response to the command.

Further to the third embodiments, the system further comprises means for storing, by the first driver and prior to populating the mailbox registers, one or more verbs from the audio codec hardware to a local memory, wherein the one or more values comprise an indicator of a low power state entry of the audio codec hardware and means for re-loading, by the first driver and in response to a power up event, the one or more verbs to the audio codec hardware.

Further to the third embodiments, the system further comprises means for storing, by the first driver and prior to populating the mailbox registers, one or more verbs from the audio codec hardware to a local memory, wherein the one or more values comprise an indicator of a low power state entry of the audio codec hardware, means for re-loading, by the first driver and in response to a power up event, the one or more verbs to the audio codec hardware, and means for enumerating, by the second driver and prior to storing the one or more verbs, the audio codec hardware with at least the one or more verbs.

Further to the third embodiments, the system further comprises means for storing, by the first driver and prior to populating the mailbox registers, one or more verbs from the audio codec hardware to a local memory, wherein the one or more values comprise an indicator of a low power state entry of the audio codec hardware, means for re-loading, by the first driver and in response to a power up event, the one or more verbs to the audio codec hardware, means for populating, by the first driver, the mailbox registers with one or more second values comprising an indicator of a power up entry, means for providing, from the audio codec hardware, a second interrupt to the second driver based on the populating of the mailbox registers with the one or more second values, means for providing, from the second driver and in response to the second interrupt, a second command to read the mailbox registers, and means for sending, by the audio codec hardware, the one or more second values from the mailbox registers to the second driver in response to the second command.

Further to the third embodiments, the system further comprises means for storing, by the first driver and prior to populating the mailbox registers, one or more verbs from the audio codec hardware to a local memory, wherein the one or more values comprise an indicator of a low power state entry of the audio codec hardware, means for re-loading, by the first driver and in response to a power up event, the one or more verbs to the audio codec hardware, means for populating, by the first driver, the mailbox registers with one or more second values comprising an indicator of a power up entry, means for providing, from the audio codec hardware, a second interrupt to the second driver based on the populating of the mailbox registers with the one or more second values, means for providing, from the second driver and in response to the second interrupt, a second command to read the mailbox registers, means for sending, by the audio codec hardware, the one or more second values from the mailbox registers to the second driver in response to the second command, and means for resuming communication between the second driver and the audio codec hardware based on the one or more second values.

Further to the third embodiments, the one or more values comprise a byte index that indexes multiple other bytes of the one or more values and the system further comprises means for populating, by the first driver, the mailbox registers with one or more second values, wherein the one or more second values comprise a second byte index that indexes multiple other bytes of the one or more second values, and wherein the one or more values and one or more second values each represent portions of a data object.

In one or more fourth embodiments, at least one machine readable medium comprises a plurality of instructions that, in response to being executed on a device, cause the device to dynamically provide communication between drivers by populating, by a first driver, mailbox registers of audio codec hardware with one or more values, receiving, at a second driver, an interrupt from the audio codec hardware based on the populating of the mailbox registers, providing, from the second driver and in response to the interrupt, a command to read the mailbox registers, and receiving, at the second driver, the one or more values from the audio codec hardware in response to the command.

Further to the fourth embodiments, the machine readable medium further comprises instructions that, in response to being executed on the device, cause the device to dynamically provide communication between drivers by storing, by the first driver and prior to populating the mailbox registers, one or more verbs from the audio codec hardware to a local memory, wherein the one or more values comprise an indicator of a low power state entry of the audio codec hardware and re-loading, by the first driver and in response to a power up event, the one or more verbs to the audio codec hardware.

Further to the fourth embodiments, the machine readable medium further comprises instructions that, in response to being executed on the device, cause the device to dynamically provide communication between drivers by storing, by the first driver and prior to populating the mailbox registers, one or more verbs from the audio codec hardware to a local memory, wherein the one or more values comprise an indicator of a low power state entry of the audio codec hardware, re-loading, by the first driver and in response to a power up event, the one or more verbs to the audio codec hardware, and enumerating, by the second driver and prior to storing the one or more verbs, the audio codec hardware with at least the one or more verbs.

Further to the fourth embodiments, the machine readable medium further comprises instructions that, in response to being executed on the device, cause the device to dynamically provide communication between drivers by storing, by the first driver and prior to populating the mailbox registers, one or more verbs from the audio codec hardware to a local memory, wherein the one or more values comprise an indicator of a low power state entry of the audio codec hardware, re-loading, by the first driver and in response to a power up event, the one or more verbs to the audio codec hardware, populating, by the first driver, the mailbox registers with one or more second values comprising an indicator of a power up entry, receiving, at the second driver, a second interrupt to from the audio codec hardware based on the populating of the mailbox registers with the one or more second values, providing, from the second driver and in response to the second interrupt, a second command to read the mailbox registers, and receiving, at the second driver, the one or more second values from the mailbox registers from the audio codec hardware in response to the second command.

Further to the fourth embodiments, the machine readable medium further comprises instructions that, in response to being executed on the device, cause the device to dynamically provide communication between drivers by storing, by the first driver and prior to populating the mailbox registers, one or more verbs from the audio codec hardware to a local memory, wherein the one or more values comprise an indicator of a low power state entry of the audio codec hardware, re-loading, by the first driver and in response to a power up event, the one or more verbs to the audio codec hardware, populating, by the first driver, the mailbox registers with one or more second values comprising an indicator of a power up entry, receiving, at the second driver, a second interrupt to from the audio codec hardware based on the populating of the mailbox registers with the one or more second values, providing, from the second driver and in response to the second interrupt, a second command to read the mailbox registers, receiving, at the second driver, the one or more second values from the mailbox registers from the audio codec hardware in response to the second command, and resuming communication between the second driver and the audio codec hardware based on the one or more second values.

Further to the fourth embodiments, the one or more values comprise a byte index that indexes multiple other bytes of the one or more values and the machine readable medium further comprises instructions that, in response to being executed on the device, cause the device to dynamically provide communication between drivers by populating, by the first driver, the mailbox registers with one or more second values, wherein the one or more second values comprise a second byte index that indexes multiple other bytes of the one or more second values, and wherein the one or more values and one or more second values each represent portions of a data object.

In one or more fifth embodiments, at least one machine readable medium may include a plurality of instructions that, in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for dynamically providing communication between drivers comprising:
    populating, by a first driver, mailbox registers of audio codec hardware with one or more values;
    providing, from the audio codec hardware, an interrupt to a second driver based on the populating of the mailbox registers;
    providing, from the second driver and in response to the interrupt, a command to read the mailbox registers; and
    sending, by the audio codec hardware, the one or more values from the mailbox registers to the second driver in response to the command.

2. The method of claim 1, wherein the first driver is a graphics driver and the second driver is an audio driver.

3. The method of claim 1, further comprising:
    storing, by the first driver and prior to populating the mailbox registers, one or more verbs from the audio codec hardware to a local memory, wherein the one or more values comprise an indicator of a low power state entry of the audio codec hardware; and
    re-loading, by the first driver and in response to a power up event, the one or more verbs to the audio codec hardware.

4. The method of claim 3, further comprising:
    enumerating, by the second driver and prior to storing the one or more verbs, the audio codec hardware with at least the one or more verbs.

5. The method of claim 3, further comprising:
    populating, by the first driver, the mailbox registers with one or more second values comprising an indicator of a power up entry;
    providing, from the audio codec hardware, a second interrupt to the second driver based on the populating of the mailbox registers with the one or more second values;
    providing, from the second driver and in response to the second interrupt, a second command to read the mailbox registers; and
    sending, by the audio codec hardware, the one or more second values from the mailbox registers to the second driver in response to the second command.

6. The method of claim 5, further comprising:
    resuming communication between the second driver and the audio codec hardware based on the one or more second values.

7. The method of claim 1, wherein the one or more values comprise a byte index that indexes multiple other bytes of the one or more values, the method further comprising:
    populating, by the first driver, the mailbox registers with one or more second values, wherein the one or more second values comprise a second byte index that indexes multiple other bytes of the one or more second values, and wherein the one or more values and one or more second values each represent portions of a data object.

8. The method of claim 1, wherein providing the command to read the mailbox registers comprises providing the command to read the mailbox registers from the second driver and through a controller.

9. The method of claim 1, wherein the audio codec hardware is within a display power well controlled at least in part by the first driver.

10. The method of claim 1, wherein populating the mailbox registers of the audio codec hardware comprises populating the mailbox registers in an immediate command mode by the first driver.

11. A system to dynamically provide communication between drivers comprising:
    audio codec hardware logic circuitry and a processor coupled to the audio codec hardware logic circuitry,
    wherein the processor is to populate, via a first driver, mailbox registers of the audio codec hardware with one or more values and to provide, via a second driver and in response to an interrupt, a command to read the mailbox registers, and
    wherein the audio codec hardware logic circuit is to provide the interrupt to the second driver based on the population of the mailbox registers and to send the one or more values from the mailbox registers to the second driver in response to the command.

12. The system of claim 11, wherein the processor is further to store, via the first driver and prior to the population of the mailbox registers, one or more verbs from the audio codec hardware to a local memory, wherein the one or more values comprise an indicator of a low power state entry of the audio codec hardware and to re-load, via the first driver and in response to a power up event, the one or more verbs to the audio codec hardware.

13. The system of claim 12, wherein the processor is further to enumerate, via the second driver and prior to the store of the one or more verbs, the audio codec hardware with at least the one or more verbs.

14. The system of claim 12, wherein the processor is further to populate, via the first driver, the mailbox registers with one or more second values comprising an indicator of a power up entry and to provide, via the second driver and in response to a second interrupt, a second command to read the mailbox registers, and wherein the audio codec hardware logic circuitry is further to providing the second interrupt to the second driver based on the population of the mailbox registers with the one or more second values and to send the one or more second values from the mailbox registers to the second driver in response to the second command.

15. The system of claim 14, wherein the processor is further to resume communication between the second driver and the audio codec hardware based on the one or more second values.

16. The system of claim 11, wherein the one or more values comprise a byte index that indexes multiple other bytes of the one or more values and the processor is further to populate, via the first driver, the mailbox registers with one or more second values, wherein the one or more second values comprise a second byte index that indexes multiple other bytes of the one or more second values, and wherein the one or more values and one or more second values each represent portions of a data object.

17. At least one non-transitory machine readable medium comprising a plurality of instructions that, in response to being executed on a device, cause the device to dynamically provide communication between drivers by:
    populating, by a first driver, mailbox registers of audio codec hardware with one or more values;
    receiving, at a second driver, an interrupt from the audio codec hardware based on the populating of the mailbox registers;
    providing, from the second driver and in response to the interrupt, a command to read the mailbox registers; and
    receiving, at the second driver, the one or more values from the audio codec hardware in response to the command.

18. The machine readable medium of claim 17 further comprising instructions that, in response to being executed on the device, cause the device to dynamically provide communication between drivers by:

storing, by the first driver and prior to populating the mailbox registers, one or more verbs from the audio codec hardware to a local memory, wherein the one or more values comprise an indicator of a low power state entry of the audio codec hardware; and re-loading, by the first driver and in response to a power up event, the one or more verbs to the audio codec hardware.

19. The machine readable medium of claim 18 further comprising instructions that, in response to being executed on the device, cause the device to dynamically provide communication between drivers by:

enumerating, by the second driver and prior to storing the one or more verbs, the audio codec hardware with at least the one or more verbs.

20. The machine readable medium of claim 18 further comprising instructions that, in response to being executed on the device, cause the device to dynamically provide communication between drivers by:

populating, by the first driver, the mailbox registers with one or more second values comprising an indicator of a power up entry;

receiving, at the second driver, a second interrupt to from the audio codec hardware based on the populating of the mailbox registers with the one or more second values;

providing, from the second driver and in response to the second interrupt, a second command to read the mailbox registers; and receiving, at the second driver, the one or more second values from the mailbox registers from the audio codec hardware in response to the second command.

21. The machine readable medium of claim 20 further comprising instructions that, in response to being executed on the device, cause the device to dynamically provide communication between drivers by:

resuming communication between the second driver and the audio codec hardware based on the one or more second values.

22. The machine readable medium of claim 17, wherein the one or more values comprise a byte index that indexes multiple other bytes of the one or more values and the machine readable medium further comprises instructions that, in response to being executed on the device, cause the device to dynamically provide communication between drivers by:

populating, by the first driver, the mailbox registers with one or more second values, wherein the one or more second values comprise a second byte index that indexes multiple other bytes of the one or more second values, and wherein the one or more values and one or more second values each represent portions of a data object.

\* \* \* \* \*